Aug. 29, 1933.   J. W. VANDERVEER   1,924,385
WHEEL
Filed July 30, 1930   2 Sheets-Sheet 1
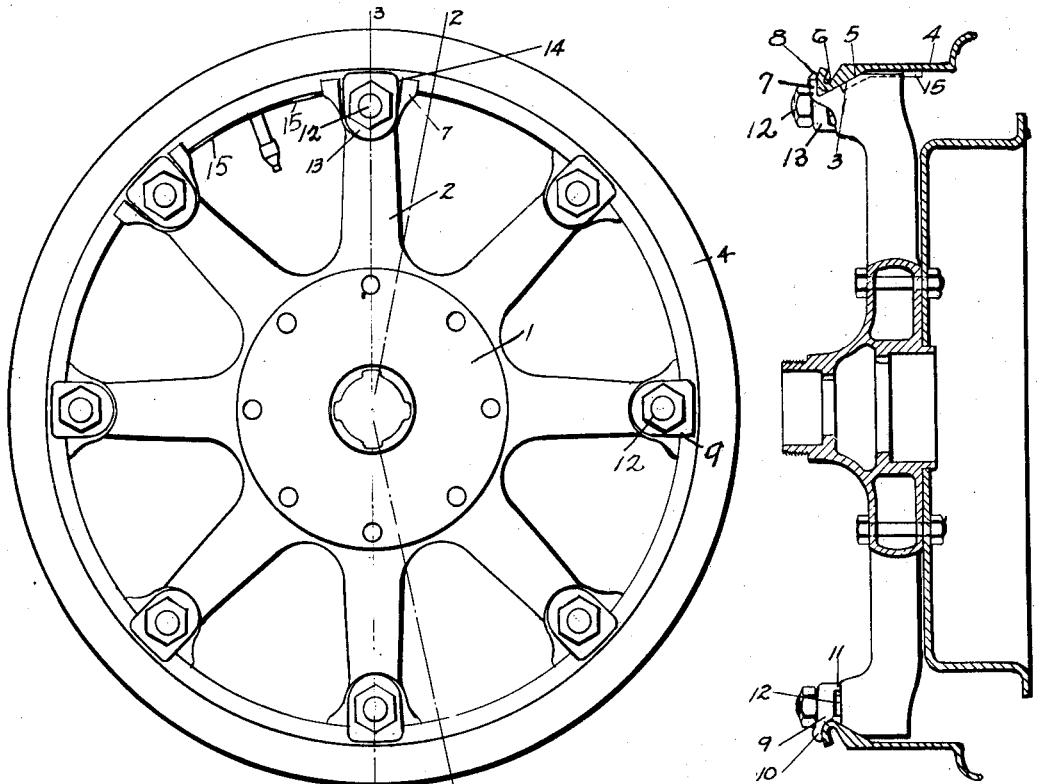
Fig. 1
Fig. 2
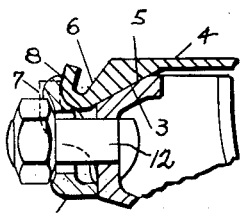
Fig. 3
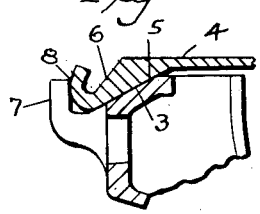
Fig. 4
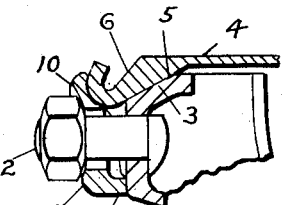
Fig. 5
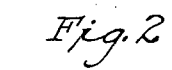
Fig. 6
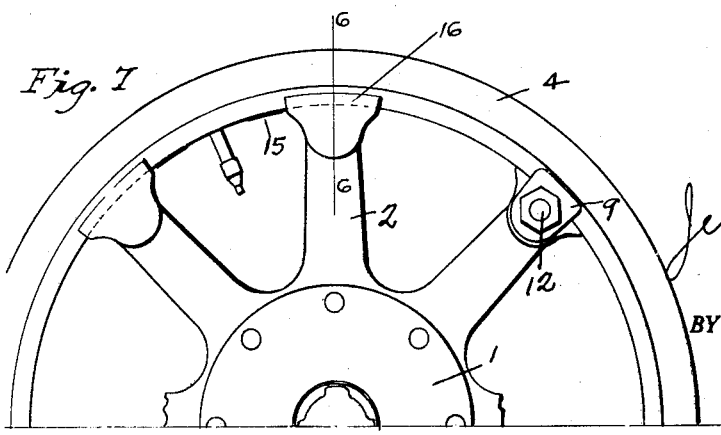
Fig. 7
Jewell W. Vanderveer
INVENTOR.
BY
ATTORNEYS.

Aug. 29, 1933.  J. W. VANDERVEER  1,924,385
WHEEL
Filed July 30, 1930  2 Sheets-Sheet 2

Jewell W. Vanderveer
INVENTOR.

BY
ATTORNEYS.

Patented Aug. 29, 1933

1,924,385

UNITED STATES PATENT OFFICE 1,924,385

WHEEL

Jewell W. Vanderveer, Syracuse, N. Y., assignor to Erie Malleable Iron Company, Erie, Pa., a corporation of Pennsylvania Application July 30, 1930. Serial No. 471,783

8 Claims. (Cl. 301—12)

The present invention is directed to the improvement of wheels provided with demountable rims. Great difficulty has been experienced in so mounting such rims that they will be in alinement with a plane at right angles to the axis of the wheel. Such alinement is important as any variation from such alinement increases the wear upon the tires. The present invention involves a simple construction whereby a definite alinement may be assured with the initial setting up, or clamping of the rim in place on the wheel center. While the invention in its broader aspects is not limited to a single wheel mounting it is of greatest advantage with such a mounting and is so shown. Features and details of the invention will appear from the specification and claims.

A preferred embodiment of the invention is illustrated in the accompanying drawings as follows:—

Fig. 1 shows an elevation of the wheel.

Fig. 2 a section on the line 2—2 in Fig. 1.

Fig. 3 an enlarged view on the line 3—3 at the upper portion of the wheel.

Fig. 4 a similar view with the clamping plate removed.

Fig. 5 an enlarged view of the lower side of the wheel on the line 3—3 in Fig. 1.

Fig. 6 an enlarged section on the line 6—6 in Fig. 7.

Fig. 7 a side elevation of an alternative construction.

Figure 8:
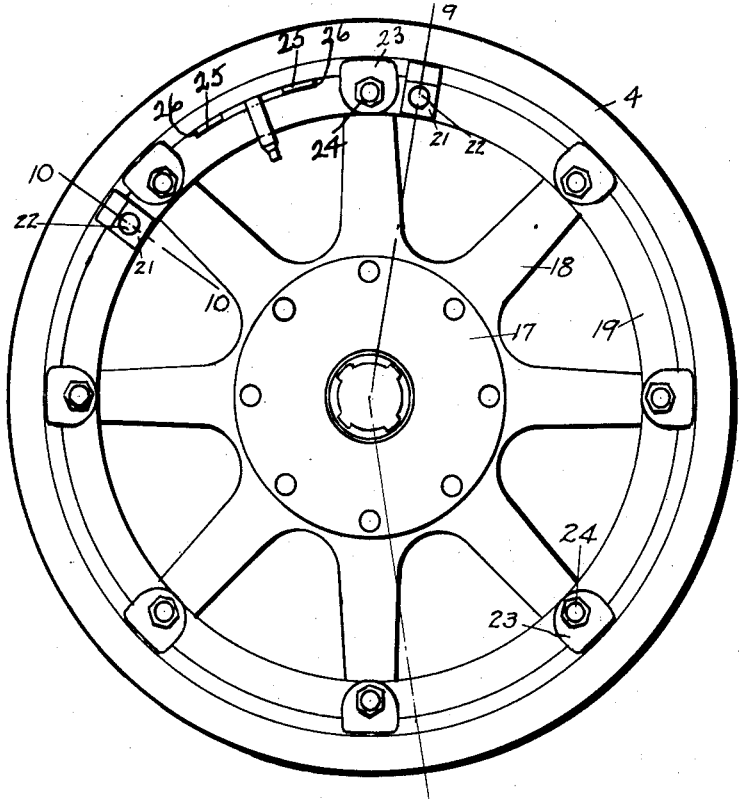

Fig. 8 a side elevation of a wheel showing a modification.

Figure 9:
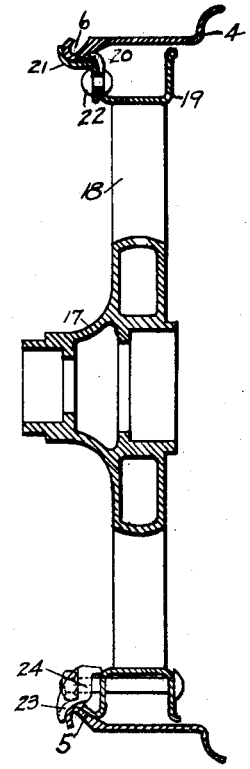

Fig. 9 a section on the line 9—9 in Fig. 8.

Figure 10:
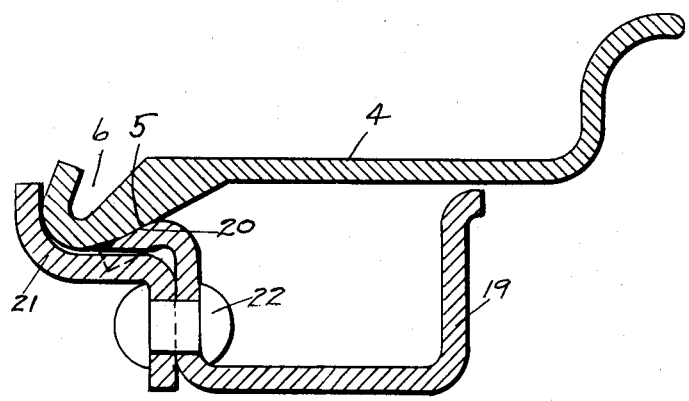

Fig. 10 a section on the line 10—10 in Fig. 8.

In the structure shown in Figs. 1 to 5, the wheel center is made up of the hub 1 with the extending spokes 2. The peripheral faces of the spokes are provided with the beveled seats 3. A rim 4 has corresponding beveled seating surfaces 5 which engage the seats 3. The surfaces 5 may be opposite the rim gutter 6 which is ordinarily provided for receiving a locking ring (not shown) for holding the tire.

Alining shoulders 7 are arranged at the ends of two adjacent spokes at one side of the wheel. These shoulders engage an outwardly facing surface 8 of the rim 4. The shoulders 7 are so positioned relatively to the opposing beveled seat 3 and the interposed portion of the rim between the shoulder and the beveled seat 3 as to locate this portion of the rim when seated between the shoulder and the seat approximately initially in the position of final alinement. To definitely accomplish this I space the extremities of the alining shoulders sufficiently that in the ordinary mounting of the rim the rim is definitely alined at right angles with the axis particularly so far as the diameter which is parallel to a chord connecting the extremities of the shoulders. The circumferential fit of the rim is also such that when the side opposite the engaged spokes is swung to place it brings the rim on the diametrical line bisecting said chord into approximate alinement at right angles to the axis of the wheel. In any event to accomplish this purpose the height of the segment based on the chord joining the extremities of the arc of the rim engaged by the shoulders should be greater than the depth of the shoulders.

The spokes, other than those having the shoulders 7 are provided with clamping plates 9, these clamping plates having lips 10 engaging the edge of the rim and inturned projections 11 engaging the face of the spoke. Clamping bolts 12 extend through the side of the spoke and exert, when set up, pressure against the edge of the rim, forcing the surface 5 into clamping engagement with the beveled seat 3.

In putting the tire in place, the rim is hooked in over the shoulders 7 and dropped into place on the beveled seat 3. The weight of the rim with the attached tire (not shown) itself assures the engagement of the edge of the rim with the shoulders 7, the rim sliding down the bevel to this position. With the rim in this position the clamping plates 9 preferably at the diametrically opposite side of the wheel are tightened and the intervening clamps tightened. In as much as the rim at the top cannot slide outwardly, due to the engagement of the shoulder 7, the rim cannot be forced inwardly at the bottom through the action of the clamps 9 beyond approximate alinement, the only misalignment being that incident to tolerances.

If the rim is subjected to very severe driving strains it may be desirable to arrange clamping plates 13 similar to the clamping plates 9 on the spokes having the shoulders 7. For this purpose the shoulder 7 is slotted at 14 permitting the clamps to project through the slots and against the rim. These clamps are set up in the same manner as the clamps 9.

Preferably the valve stem indicated in dotted lines in Fig. 1 is placed between the spokes having the shoulders 7 and is, therefore, at the top of the wheel as the rim is moved into place and the rim is also provided with driving lugs 15 which engage the forward, or back faces of the spokes. Under usual conditions it is unnecessary to provide clamping plates for the spokes having the shoulder 7.

In Figs. 6 and 7 I show a construction in which a shoulder 16 extends entirely across the face of the spoke and is not provided with the slot 14. In some ways the structure shown in Fig. 7 is a little nearer fool-proof than that shown in Fig. 1 in that the operator is prevented from initially mis-alining the rim to some extent by operating the clamps 13.

In the structure shown in Figs. 8, 9 and 10 the wheel center comprises the hub 17, spokes 18 and the felloe 19. The felloe has a tapered peripheral seating surface 20 and lugs 21 are fixed on the felloe by rivets 22, the lugs being positioned with relation to the seating surface to engage the face 8 of the rim and position the beveled surface 5 on the beveled seating surface 20 at the point of proper alinement when the rim is clamped in place. Clamping plates 23 operate against the rim, preferably one plate at each spoke and these clamping plates are actuated by clamping bolts 24 which extend through the felloe and the plates. The two lugs 21 are placed preferably adjacent to two spokes and the wheel rim is hooked over these lugs and allowed to swing to position at the bottom. The clamping plates are put in place and the clamping plates directly opposite the lugs 21 are first set up. This positively positions the wheel in alined position and then the other plates are set up, thus assuring definite alinement.

The device as a whole affords a very simple method of achieving alinement in that the hook formed at the top simplifies the initial engagement, or placement of the rim on the wheel and all that the operator has to do is to set up the other bolts to get alinement within very close limits.

In Fig. 8 driving lugs 25 engage shoulders 26 on the felloe.

What I claim as new is:—

1. In a wheel, the combination of a wheel center having a beveled seat on its periphery; a demountable rim seated on said seat; an alining shoulder facing said beveled seat extending from the periphery at one side of the wheel center and engaging an axially faced surface on the rim, the engaging surface of the shoulder and rim being more nearly radial than axial, said shoulder and opposing seat engaging points on the rim spaced apart a distance making the height of the segment based on the chord extending between the points greater than the depth of the shoulder; and means engaging the rim at the side of the wheel opposite the shoulder forcing the rim axially into clamping engagement with the seat.

2. In a wheel, the combination of a wheel center having a hub with extending spokes, said spokes having a beveled seat on their peripheral faces; a demountable rim seating on said seat; an alining shoulder facing said beveled seat on different spokes at one side of the wheel center and engaging an axially faced surface on the rim, the engaging surfaces of the shoulders and rim being more nearly radial than axial and engaging points on the rim spaced apart a distance making the height of the segment based on the chord extending between the points greater than the depth of the shoulders; and means engaging the rim at the side of the wheel opposite the shoulders forcing the rim axially into clamping engagement with the seat.

3. In a wheel, the combination of a wheel center having a beveled seat on its periphery; a demountable rim seated on said seat; an alining shoulder facing said beveled seat extending from the periphery at one side of the wheel center and engaging an axially faced surface on the rim, the engaging surface of the shoulder and rim being more nearly radial than axial, said shoulder and opposing seat engaging points on the rim spaced apart a distance making the height of the segment based on the chord extending between the points greater than the depth of the shoulder, said shoulder being slotted; means engaging the rim at the side of the wheel opposite the shoulder forcing the rim axially into clamping engagement with the seat; and clamping means extending through the slot in the shoulder against the rim.

4. In a wheel, the combination of a wheel center having a hub with extending spokes, said spokes having a beveled seat on their peripheral faces; a demountable rim seating on said seat; an alining shoulder facing said beveled seat on different spokes at one side of the wheel center and engaging an axially faced surface on the rim, the engaging surfaces of the shoulders and rim being more nearly radial than axial and engaging points on the rim spaced apart a distance making the height of the segment based on the chord extending between the points greater than the depth of the shoulders, the shoulders on said spokes being slotted; means engaging the rim at the side of the wheel opposite the shoulders forcing the rim axially into clamping engagement with the seat; and clamping means extending through the slots in the shoulders against the rim.

5. In a wheel, the combination of a wheel center having a beveled seat on its periphery; a demountable rim seated on said seat; an alining shoulder facing said beveled seat extending from the periphery at one side of the wheel center and engaging an axially faced surface on the rim, the engaging surface of the shoulder and rim being more nearly radial than axial, said shoulder and opposing seat engaging points on the rim spaced apart a distance making the height of the segment based on the chord extending between the points greater than the depth of the shoulder; and means engaging the rim at the side of the wheel opposite the shoulder forcing the rim axially into clamping engagement with the seat, the shoulder being the only means acting on the rim in the portion engaged by the shoulder.

6. In a wheel, the combination of a wheel center; a felloe on the wheel center having a beveled seat on its periphery; a demountable rim seating on said seat; an alining shoulder facing said beveled seat extending from the periphery at one side of the wheel center and engaging an axially faced surface on the rim, the engaging surface of the shoulder and rim being more nearly radial than axial, said shoulder and opposing seat engaging points on the rim spaced apart a distance making the height of the segment based on the chord extending between the points greater than the depth of the shoulder; and means engaging the rim at the side of the wheel opposite the shoulder forcing the rim axially into clamping engagement with the seat.

7. In a wheel, the combination of a wheel center having a beveled seat on its periphery; a demountable rim seated on said seat; an alining shoulder facing said beveled seat extending from the periphery at one side of the wheel center and engaging an axially faced surface on the rim, the engaging surface of the shoulder and rim being in a plane perpendicular to the axis of the wheel, said shoulder and opposing seat engaging points on the rim spaced apart a distance making the height of the segment based on the chord extending between the points greater than the depth of the shoulder; and means engaging the rim at the side of the wheel opposite the shoulder forcing the rim axially into clamping engagement with the seat.

8. In a wheel, the combination of a wheel center having a hub with extending spokes, said spokes having a beveled seat on their peripheral faces; a demountable rim seating on said seat; an alining shoulder facing said beveled seat on different spokes at one side of the wheel center and engaging an axially faced surface on the rim, the engaging surfaces of the shoulders and rim being in a plane perpendicular to the axis of the wheel and engaging points on the rim spaced apart a distance making the height of the segment based on the chord extending between the points greater than the depth of the shoulders; and means engaging the rim at the side of the wheel opposite the shoulders forcing the rim axially into clamping engagement with the seat.

JEWELL W. VANDERVEER.